United States Patent
Saiki (10) Patent No.: US 9,965,291 B2
(45) Date of Patent: May 8, 2018

(54) INFORMATION PROCESSING APPARATUS ENABLING HIGH-SPEED START-UP, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Kenji Saiki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 327 days.

(21) Appl. No.: 14/458,443

(22) Filed: Aug. 13, 2014

(65) Prior Publication Data
US 2015/0052341 A1    Feb. 19, 2015

(30) Foreign Application Priority Data
Aug. 14, 2013  (JP) .................... 2013-168568

(51) Int. Cl.
*G06F 15/177*  (2006.01)
*G06F 9/44*    (2018.01)

(52) U.S. Cl.
CPC .......... *G06F 9/4406* (2013.01); *G06F 9/4401* (2013.01)

(58) Field of Classification Search
CPC .................................................. G06F 9/4401
See application file for complete search history.

(56) References Cited

U.S. PATENT DOCUMENTS 4,697,266 A * 9/1987 Finley ................. G06F 11/1441
714/16
6,965,989 B1 * 11/2005 Strange .................... G06F 1/24
709/220

(Continued)

FOREIGN PATENT DOCUMENTS

JP    2005-011120 A    1/2005
JP    2006093963 A     4/2006

(Continued)

OTHER PUBLICATIONS

Office Action issued in Japanese Appln. No. 2013-168568 dated May 16, 2017.

*Primary Examiner* — Kim Huynh
*Assistant Examiner* — Eric Chang
(74) *Attorney, Agent, or Firm* — Rossi, Kimms & McDowell LLP (57) ABSTRACT

An information processing apparatus that can execute a start-up process properly, even when electric power is cut off without performing a normal power turn-OFF process. A first storage unit stores a program. A second storage unit continues holding information even when a power supply stops. A third storage unit stores information showing a power-OFF-timing state of the information processing apparatus. A control unit determines whether the information showing the power-OFF-timing state obtained from the third storage unit needs read-out of a program at a power ON timing of the information processing apparatus, performs a start-up process after reading and developing the program from the first storage unit to the second storage unit when the read-out of the program is needed, and performs the start-up process without reading and developing the program from the first storage unit to the second storage unit when the read-out of the program is not needed.

11 Claims, 6 Drawing Sheets

(56) References Cited

U.S. PATENT DOCUMENTS

| | | |
|---|---|---|
| 7,730,541 B2 | 6/2010 | Kawaguchi et al. |
| 8,107,105 B2 | 1/2012 | Sakai |
| 2004/0044890 A1* | 3/2004 | Lim .................. G06F 9/4406 713/2 |
| 2006/0007469 A1* | 1/2006 | Uruma ............... H04N 1/0035 358/1.14 |
| 2006/0192988 A1* | 8/2006 | Yamanaka ........... G06F 21/608 358/1.14 |
| 2007/0220372 A1* | 9/2007 | Chen ..................... G06F 8/65 714/52 |
| 2009/0313617 A1* | 12/2009 | Hung ................ G06F 11/1092 717/168 |

FOREIGN PATENT DOCUMENTS

| | | |
|---|---|---|
| JP | 2006106823 A | 4/2006 |
| JP | 2009113451 A | 5/2009 |
| JP | 2013003984 A | 1/2013 |
| JP | 2013004042 A | 1/2013 |

* cited by examiner

INFORMATION PROCESSING APPARATUS ENABLING HIGH-SPEED START-UP, CONTROL METHOD THEREFOR, AND STORAGE MEDIUM STORING CONTROL PROGRAM THEREFOR

BACKGROUND OF THE INVENTION

Field of the Invention

The present invention relates to an information processing apparatus that enables high-speed start-up, a control method therefor, and a storage medium storing a control program therefor.

Description of the Related Art

Many conventional information processing apparatuses store operating systems (OS) and various application programs in external storage units, such as hard disk drives (HDD) and FLASH memories. Then, when starting an information processing apparatus from a power-OFF state, the OS and the programs are read out to a volatile DRAM (Dynamic Random Access Memory) as a main memory, and is executed. Accordingly, data including the OS and the programs read to the DRAM is lost whenever the power is turned OFF, and there is a problem that start-up of an information processing apparatus takes time. In regard to this problem, there is a hibernation technology that suspends a system after saving the entire data on a main memory at the timing just before turning OFF the power to an external storage unit, and that develops the saved data to the main memory in order to shorten the start-up time of the information processing apparatus.

In recent years, there is a proposed method for shortening start-up time using a nonvolatile MRAM (Magnetoresistive Random Access Memory) that holds data even if power supply stops and that differs from a volatile memory like a DRAM (see Japanese Laid-Open Patent Publication (Kokai) No. 2005-11120 (JP 2005-11120A)).

An access speed of an MRAM is similar to that of a DRAM, and an MRAM can hold data after turning power OFF as well as an HDD. Accordingly, when an MRAM is used as a main memory, a state of the main memory can be held even if the power is turned OFF and ON without saving data to an external storage unit and reading therefrom unlike the hibernation technology. As a result, the start-up time can become shorter than that using the conventional hibernation technology.

On the other hand, when an MRAM is used as a main memory, the memory contents will be rewritten successively during executing a program. Accordingly, when electric power is cut off without performing a normal power turn-OFF process, the contents of the MRAM may be saved in a state where a program is running, and the program may not be normally executed when the power is turned ON at the next time.

SUMMARY OF THE INVENTION

The present invention provides a start-up control technology that can execute a start-up process of an apparatus properly, even when electric power is cut off without performing a normal power turn-OFF process.

Accordingly, a first aspect of the present invention provides An information processing apparatus comprising a first storage unit configured to store a program, a second storage unit configured to continue holding information even when a power supply stops, a third storage unit configured to store information showing a power-OFF-timing state of the information processing apparatus, and a control unit configured to determine whether the information showing the power-OFF-timing state obtained from the third storage unit needs read-out of a program at a power ON timing of the information processing apparatus, to perform a start-up process after reading and developing the program from the first storage unit to the second storage unit when the read-out of the program is needed, and to perform the start-up process without reading and developing the program from the first storage unit to the second storage unit when the read-out of the program is not needed.

Accordingly, a second aspect of the present invention provides a control method for an information processing apparatus equipped with a first storage unit that stores a program, second and third storage units that continue holding information even when a power supply stops, and a control unit that controls the storage units to execute a program, the control method comprising storing information showing a power-OFF-timing state of the information processing apparatus to the third storage unit, determining whether the information showing the power-OFF-timing state obtained the third storage unit needs read-out of a program at a power ON timing of the information processing apparatus, performing a start-up process after reading and developing the program from the first storage unit to the second storage unit when the read-out of the program is needed, and performing the start-up process without reading and developing the program from the first storage unit to the second storage unit when the read-out of the program is not needed.

Accordingly, a third aspect of the present invention provides a non-transitory computer-readable storage medium storing a control program causing a computer to execute the control method of the second aspect.

The information processing apparatus of the present invention detects the power-OFF state, and saves the detection result concerned in the third storage unit as information showing the power-OFF-timing state. At the time of power ON, the information processing apparatus determines whether the apparatus reads a program from the first storage unit to the second storage unit and executes it based on the information obtained from the third storage unit. Since the program is read from the first storage unit and is developed onto the second storage unit when the electric power is cut off without performing the normal power turn-OFF process, the apparatus can be started properly.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
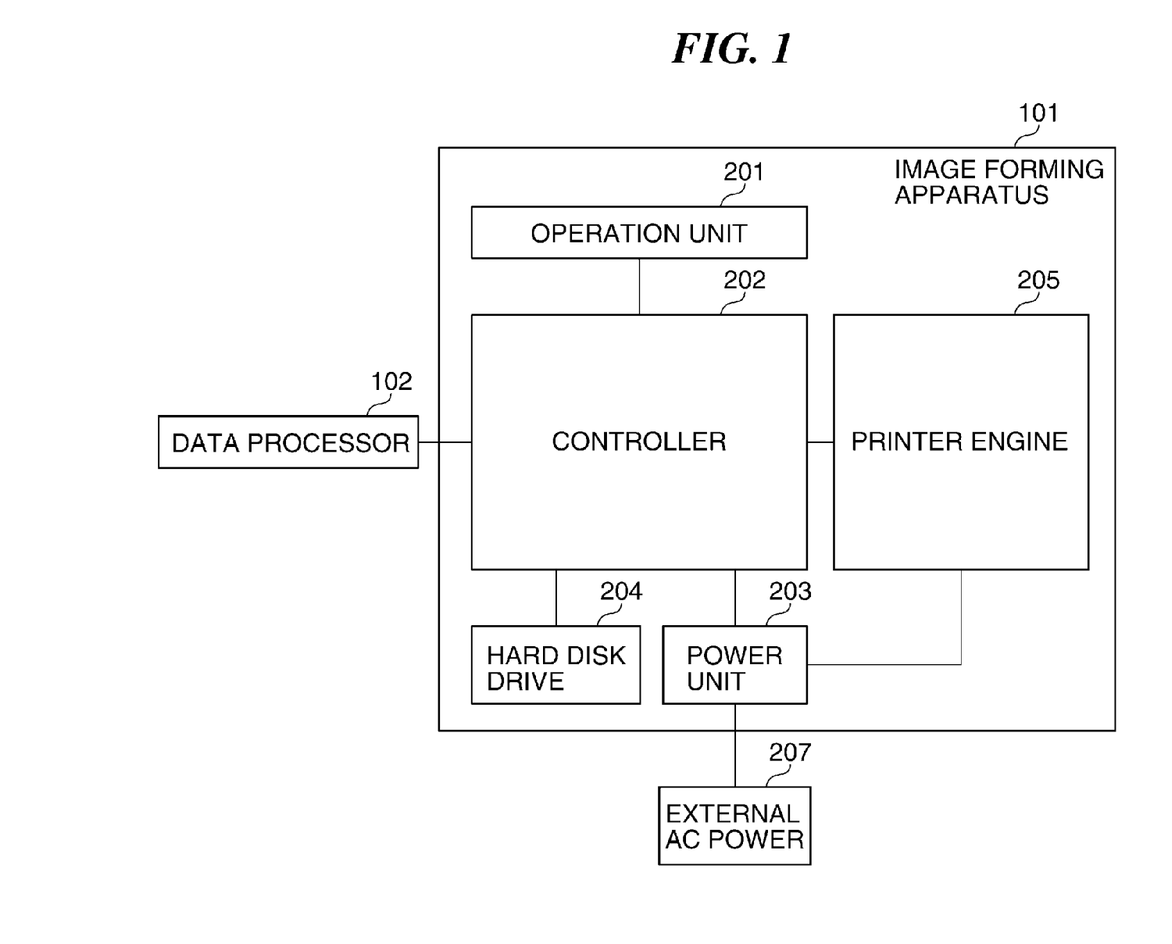
FIG. 1 is a block diagram schematically showing a configuration of an image forming apparatus as an information processing apparatus according to a first embodiment of the present invention.

FIG. 1 is a block diagram schematically showing a configuration of an image forming apparatus 101 as an information processing apparatus according to the first embodiment of the present invention. The image forming apparatus 101 has a controller 202, a printer engine 205, an operation unit 201, a power unit 203, and a hard disk drive 204.

The controller 202 generally controls the image forming apparatus 101 by connecting with other units and issuing instructions. Moreover, the controller 202 is connected to an external data processor 102.

The printer engine 205 prints a digital image on paper according to image data supplied from the controller 202. The operation unit 201 is provided with manual operation buttons by which a user sets and operates the image forming apparatus 101, and a display panel like a liquid crystal display that shows various kinds of information about the image forming apparatus 101 to a user. The hard disk drive 204 stores a digital image, its resource information that is used when generating the digital image, and the like. It should be noted that the hard disk drives 204 may be replaced with another storage device other than a hard disk drive.

The power unit 203 is connected to an external AC power 207, and supplies electric power to each unit in the image forming apparatus 101.

The data processor 102 is a computer that issues a print job and gives an instruction to the image forming apparatus 101 through a communication interface, such as a LAN, for example.

It should be noted that the information processing apparatus to which the present invention is applied is not limited to the printer with the illustrated configuration, but may be a digital multifunctional peripheral device having an image forming function.

Figure 2:
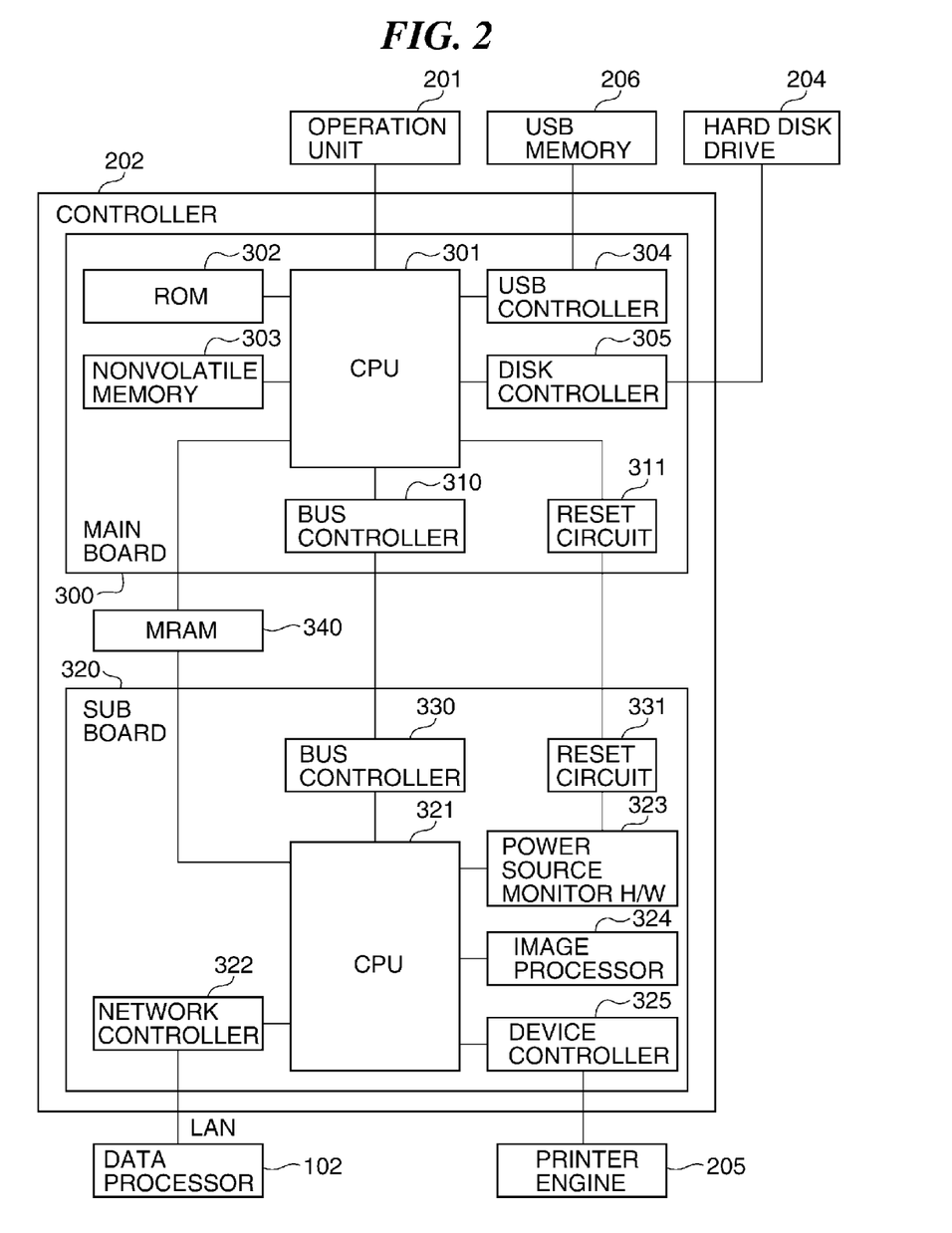
FIG. 2 is a block diagram schematically showing a configuration of a controller included in the image forming apparatus shown in FIG. 1.

FIG. 2 is a block diagram schematically showing the configuration of the controller 202 included in the image forming apparatus 101 shown in FIG. 1. It should be noted that many CPU peripheral hardware devices, such as a chip set, a bus bridge, and a clock generator, which are included in a main CPU 301 and a sub CPU 321 are not shown for simplifying a description.

The controller 202 has a main board 300 and a sub board 320. The main board 300 is a general-purpose CPU system, and has the following configuration.

The main CPU 301 controls the whole main board 300. The main CPU 301 is connected to the operation unit 201, a ROM 302, a nonvolatile memory 303, a bus controller 310, a reset circuit 311, a USB controller 304, and a disc controller 305.

The ROM 302 stores programs that the main CPU 301 and the sub CPU 321 execute. The nonvolatile memory 303 is connected to the main CPU 301, stores setup information about the image forming apparatus 101 and counter information relevant to printing, and holds the information even if the power supply is stopped.

The USB controller 304 is connected to the USB memory 206, and controls input/output of data to/from the USB memory 206. The USB memory 206 stores various data that should be used in the image forming apparatus 101. The disc controller 305 is connected to the hard disk drive 204, and controls input/output of data to/from the hard disk drive 204.

The bus controller 310 has a bridge function with the bus controller 330 on the sub board 320. The reset circuit 311 resets a setting of the H/W (hardware) on the main board 300.

The sub board 320 consists of a comparatively small general-purpose CPU system and image processing hardware, and has the following configuration.

The sub CPU 321 controls the whole sub board 320. The sub CPU 321 is connected to a bus controller 330, a network controller 322, power source monitor H/W 323, an image processor 324, and a device controller 325.

The network controller 322 exchanges data with the data processors 102 through the LAN. The power source monitor H/W 323 is connected to the reset circuit 331 and monitors the power control of this system. When the sub CPU 321 is operatable normally, the system can be reset through the reset circuit 331 and the reset circuit 311 according to instructions from the sub CPU 321. Moreover, when the electric power is not supplied to the sub CPU 321, the power of the controller 202 can be turned ON according to an input from a power switch (not shown). In the case of an ASIC etc., small CPU systems may be sufficient as this.

The reset circuit 331 resets a setting of the H/W (hardware) on the sub board 320. The image processor 324 performs a real-time digital image process. The device controller 325 is connected to the printer engine 205 and controls the printer engine 205. The bus controller 330 has a bridge function with the bus controller 310 on the main board 300.

The controller 202 has an MRAM 340 in addition to the above mentioned components. The MRAM 340 can be accessed from both of the main CPU 301 and the sub CPU 321, and is used as a main memory of each CPU. It should be noted that a DRAM may be used together as a main memory, but such a configuration is not described in this embodiment.

Figure 3A:
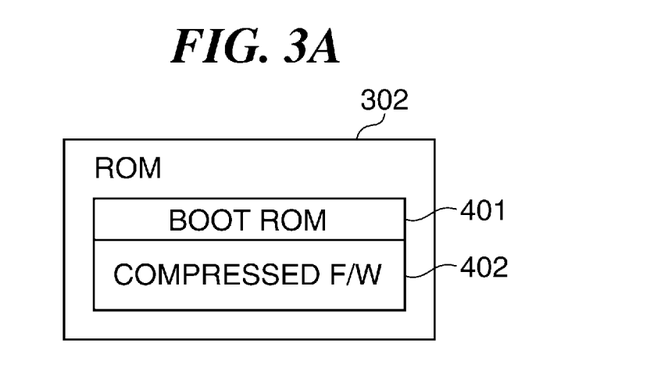
FIG. 3A is a schematic view showing a program stored in a ROM shown in FIG. 2.
Figure 3B:
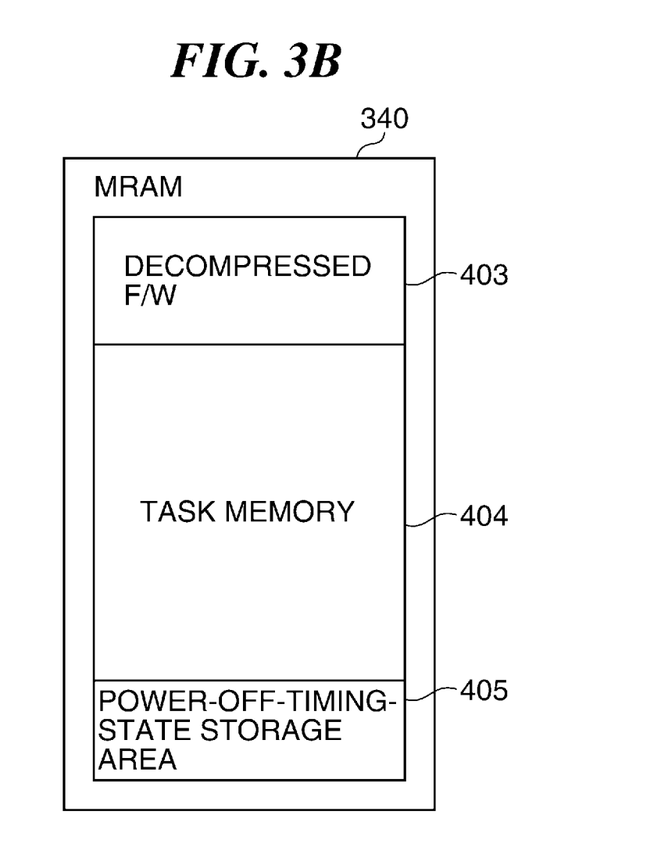
FIG. 3B is a schematic view showing a program stored in an MRAM shown in FIG. 2.

FIG. 3A is a schematic view showing a program stored in the ROM 302 shown in FIG. 2. FIG. 3B is a schematic view showing a program stored in the MRAM 340 shown in FIG. 2.

The main CPU 301 reads out compressed F/W (firmware) 402, which is a main program of each of the main CPU 301 and the sub CPU 321, from the ROM 302 according to a boot ROM 401 as an initializer of the ROM 302 and stores it to the MRAM 340 after decompression. Then, the main CPU 301 achieves the function of the image forming apparatus mentioned below using the decompressed F/W 403 by operating an OS and a task (not shown) using a task memory 404.

A power-OFF-timing-state storage area 405 stores information showing a state of the image forming apparatus 101 at which the main CPU 301 turned OFF the power of the image forming apparatus 101 at the specified timing mentioned below.

Next, the print operation in the image forming apparatus 101 will be described.

The sub CPU 321 receives print data described in the Page Description Language (PDL), for example, that is transmitted from the data processor 102 through the network controller 322, and saves it in the task memory 404 of the MRAM 340.

When checking the print data receipt by the sub CPU 321, the main CPU 301 analyzes the print data described in the PDL and saves it in the task memory 404 as intermediate data that the image processor 324 can convert into bitmap data.

When checking generation of the intermediate data, the sub CPU 321 inputs the intermediate data read from the task memory 404 into the image processor 324. The image processor 324 outputs bitmap data to the task memory 404 through the sub CPU 321. Next, the sub CPU 321 transmits a print request to the printer engine 205 through the device controller 325 according to the generation of the bitmap data, and gives the position of the image data (bitmap data) in the task memory 404 to the image processor 324 simultaneously. The sub CPU 321 transmits the image data in the task memory 404 to the printer engine 205 through the image processor 324 and the device controller 325 according to an image transfer synchronizing signal from the printer engine 205. The printer engine 205 prints the digital image data transmitted from the controller 202 on paper according to a specified electrophotography process.

Moreover, the image forming apparatus 101 is provided with a sleep function and a login function as additional functions.

The sleep function transfers the image forming apparatus 101 to a power saving state (a power saving mode etc.) in order to reduce the power consumption of the image forming apparatus 101, when a job is not executed beyond predetermined period. The predetermined period may be a default value or may be set by a user.

The login function receives a user ID and a password that correspond to an individual user and are inputted through the operation unit 201, and receives various kinds of input jobs, only when personal authentication succeeded. Recording a user and a history of executed jobs improves security.

The image forming apparatus 101 can set up valid or invalid for each of the above-mentioned additional functions. A user can select valid or invalid for each of the above-mentioned additional functions through a setting screen displayed on the display panel of the operation unit 201.

Moreover, the image forming apparatus 101 is provided with a function that displays a usual screen, a login screen, a user mode screen, and a service mode screen on the display panel of the operation unit 201. These screens are switched if needed, when a user performs a specified operation.

The usual screen is usually displayed on the operation unit 201. The image forming apparatus 101 receives execution instructions for the above-mentioned various jobs through operation buttons with which the operation unit 201 is provided while the usual screen is displayed. Moreover, when a user's specified operation is received, the display is changed to the below-mentioned user mode screen.

The login screen is displayed when the above-mentioned login function is set to be valid. While displaying the login screen, the image forming apparatus 101 receives inputs of a user ID and a password through the operation buttons of the operation unit 201. When the user ID and the password inputted by the user are effective, the display of the operation unit 201 is changed to the usual screen.

The user mode screen is a setting screen on which a general user changes the settings of the setting items except servicemen-oriented special setting items. In many general image forming apparatuses, the user mode screen is merely called a setting screen. However, this embodiment calls the user mode screen in order to clarify distinction from the service mode screen mentioned later. A user can set valid or invalid of each of a start-up time shortening function and the login function on the user mode screen.

The service mode screen allows a serviceman to adjust operations of the image forming apparatus 101 and to change settings of the special setting items. A serviceman can set valid or invalid of a perfect erase function on the service mode screen.

Next, a method for shortening start-up time of the image forming apparatus 101 using the MRAM 340 will be described with reference to FIG. 3, FIG. 4, and FIG. 5. It should be noted that operations shown in flowcharts described below are achieved when the main CPU 301 and the sub CPU 321 execute the decompressed F/W 403 developed onto the MRAM 340.

Figure 4:
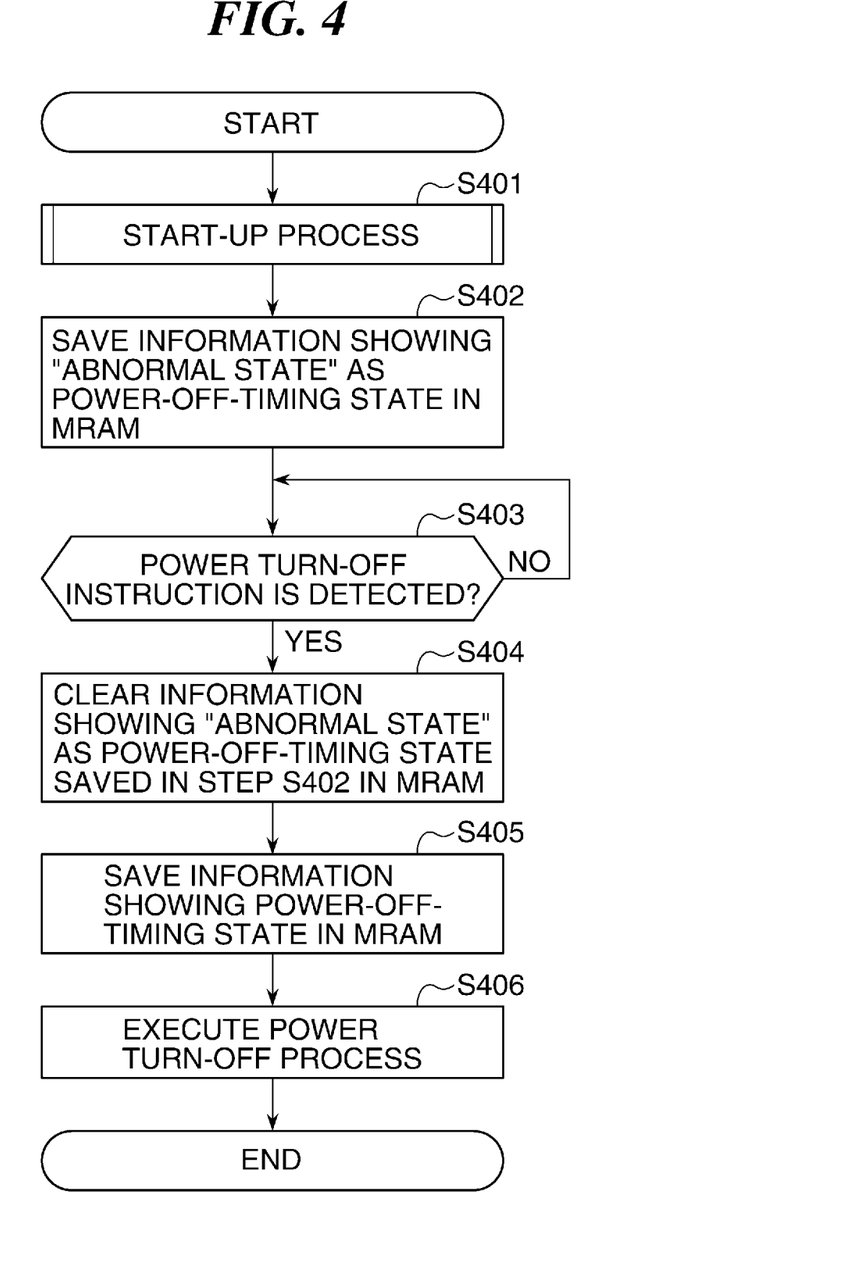
FIG. 4 is a flowchart showing a start-up process and a power-OFF process in the image forming apparatus in FIG. 1.

FIG. 4 is a flowchart showing a start-up process and a power-OFF process in the image forming apparatus 101.

In step S401, the start-up process is executed first. Details of the start-up process will be described later with reference to FIG. 5.

Next, in step S402, the main CPU 301 saves an "abnormal state" in the power-OFF-timing-state storage area 405 in the MRAM 340 as information showing a state at the time of the power OFF (a power-OFF-timing state) of the image forming apparatus 101. This enables to save the power-OFF-timing state as the "abnormal state" in the power-OFF-timing-state storage area 405, when it is determined that the power was turned OFF without receiving a power turn-OFF instruction by the main CPU 301 in step S403 mentioned later. The power is turned OFF without receiving a power turn-OFF instruction because of a power cut or a power cable pull-out, for example. It should be noted that the information showing the power-OFF-timing state may be saved in a nonvolatile memory other than the MRAM 340.

Next, the main CPU 301 determines whether a power turn-OFF instruction is detected in the step S403. A power turn-OFF instruction is an instruction generated by a user's operation through the operation unit 201 or an instruction from data processor 102 through the network controller 322, for example. Alternatively, the main CPU 301 may issue a power turn-OFF instruction under a specific condition, such as a specific timing or sleep continuation time. Moreover, a power turn-OFF instruction may be detected by any method and configuration.

When the CPU 301 determines that a power turn-OFF instruction is detected in the step S403, the main CPU 301 clears the information saved in the step S402 to the power-OFF-timing-state storage area 405 of the MRAM 340 (step S404).

In the next step S405, the main CPU 301 and the sub CPU 321 detect the power-OFF-timing state of the image forming apparatus 101, and save the information showing the power-OFF-timing state in the power-OFF-timing-state storage area 405. The power-OFF-timing state of the image forming apparatus 101 includes "waiting for printing" that shows a state where a power turn-OFF instruction is received when a printing operation is not performed, for example. Moreover, "under printing" that shows a state where a power turn-OFF instruction is received during a printing operation is included. Furthermore, an "upgrade state" that shows a state where the main CPU 301 issues a power turn-OFF instruction to itself after updating a program stored in the ROM 302 by the data processor 102 through the network controller 322 is included.

Next, the main CPU 301 executes the power turn-OFF process in step S406. The power turn-OFF process suspends the USB controller 304, the disc controller 305, the network controller 322, the image processor 324, and the device controller 325. Moreover, the tasks under operation by the main CPU 301 and the sub CPU 321 are subjected to a suspension process as the power turn-OFF process. At last the electric power supply to the controller 202 and the printer engine 205 from the power unit 203 is suspended. In addition, the MRAM 340, which is a main memory of the controller 202, keeps on holding the information about the task in the suspended state even after the electric power supply stops.

Next, details of the start-up process in the step S401 in FIG. 4 will be described with reference to FIG. 5.

Figure 5:
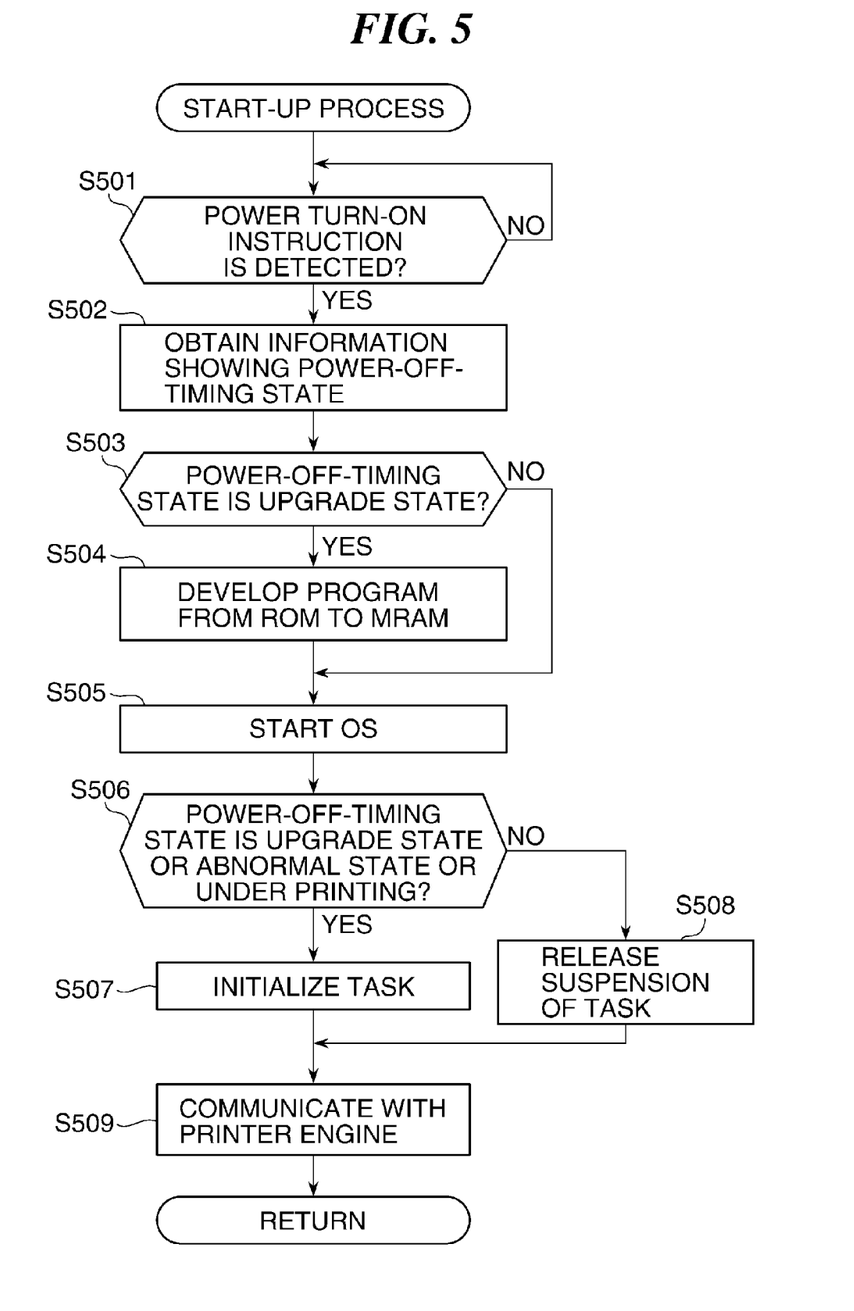
FIG. 5 is a flowchart showing details of the start-up process according to the first embodiment of the present invention.

FIG. 5 is a flowchart showing details of the start-up process according to the first embodiment of the present invention.

In step S501, the power source monitor H/W 323 checks detection of a power turn-ON instruction. Specifically, depression of a power button (not shown) of the image forming apparatus 101 is checked.

In the next step S502, the main CPU 301 obtains the information showing the power-OFF-timing state from the power-OFF-timing-state storage area 405 according to the information in the boot ROM 401. It should be noted that the information showing the power-OFF-timing state may not be saved (when turned OFF normally).

In step S503, the main CPU 301 determines whether the information showing the power-OFF-timing state obtained in the step S502 needs read-out of a program. In this example, when the information showing the power-OFF-timing state shows the upgrade state, it is determined that read-out of a program is needed. When it is determined that the information shows the upgrade state (Yes in the step S503), the process proceeds to step S504. In the step S504, the main CPU 301 decompresses the compressed F/W 402 in the ROM 302, and develops it as the decompressed F/W 403 on the MRAM 340 (a program development process). On the other hand, when it is determined that the information does not show the upgrade state (No in the step S503), the main CPU 301 proceeds with the process to step S505 without performing the program decompression process because the decompressed F/W 403 has been already developed on the MRAM 340. Since the program decompression process is executed only when it is needed in a state like the upgrade state, the start-up time can be shortened.

In the step S505, the main CPU 301 and the sub CPU 321 execute the decompressed F/W 403, and start the OS.

In the next step S506, the main CPU 301 determines whether initialization of a task is required based on the information showing the power-OFF-timing state obtained in the step S502. That is, when the power-OFF-timing state is the "upgrade state", "under printing", or "abnormal state" (Yes in the step S506), the process proceeds to step S507, and the CPU 301 initializes the task. In other than these states, the process proceeds to step S508, and the main CPU 301 releases suspension of the task.

When a task keeps a certain state and is suspended normally (i.e., the power-OFF-timing state is the "waiting for printing" state), the task can be resumed by only releasing suspension (step S508). On the other hand, when the power-OFF-timing state is the "under printing" or "abnormal state", the data saved in the task memory 404 of the MRAM 340 is rewritten frequently just before the power OFF. Accordingly, since the data saved in the task memory 404 cannot be continuously used even if the suspension of the task is released, the task is initialized (the step S507). Thus, since only the task that is determined to need initialization in the step S506 is initialized, the apparatus can start up normally regardless of the data saving state of the MRAM 340 just before the power OFF. When the initialization of the task is unnecessary, the suspension is only released, which can shorten the start-up time.

In step S509, the sub CPU 321 communicates with the printer engine 205 through the device controller 325. This process is executed regardless of the power-OFF-timing state obtained in the step S502. This is because the sub CPU 321 needs to communicate with the printer engine 205 for a specific initialization, and cannot continuously use the memory area concerning the communication with the printer engine 205 in the task memory 404 of the MRAM 340.

According to the above-mentioned first embodiment, the state of the image forming apparatus 101 at the time of the power OFF (the power-OFF-timing state) is detected, and the detection result is saved in the power-OFF-timing-state storage area 405 of the MRAM 340 as the information showing the power-OFF-timing state. At the time of the power ON of the image forming apparatus 101, it is determined whether the program should be read from the ROM to the MRAM 340 to execute it based on the information obtained from the power-OFF-timing-state storage area 405 (the step S503). Accordingly, even when electric power is cut off without performing the normal power turn-OFF process, the start-up process of the apparatus thereafter can be properly executed. Moreover, unlike hibernation, since accesses (writing and reading) to an external storage unit are unnecessary, the time required at the times of the power OFF and the power ON can be shortened.

Although details are not described in this embodiment, the USB controller 304, the disc controller 305, the network controller 322, etc. are started at necessary timings in the power turn-ON process. Moreover, although the power turn-ON processes corresponding to the some power-OFF-timing states are described in this embodiment, a suitable power turn-ON process can be performed for another state at the time of the power OFF similarly.

Figure 6:
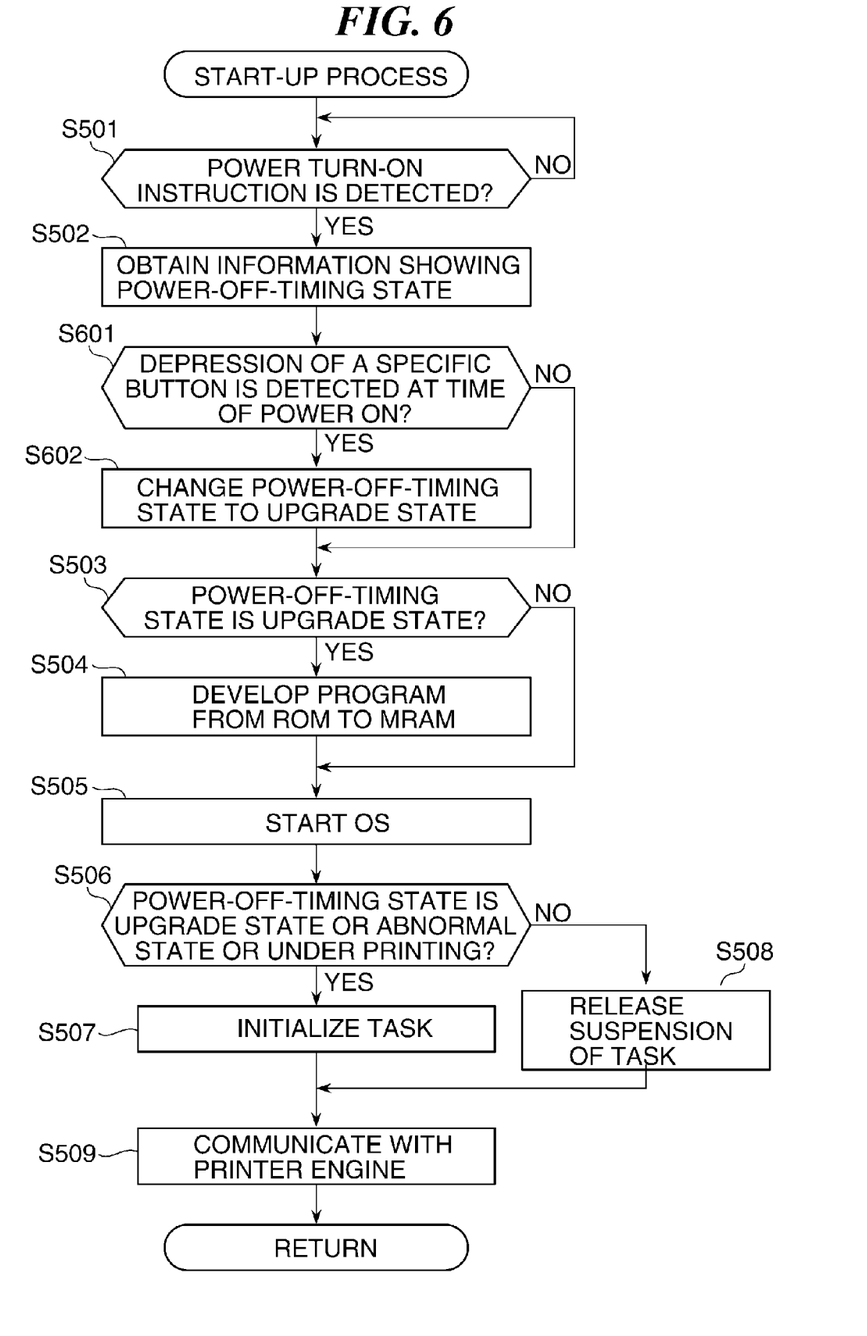
FIG. 6 is a flowchart showing details of a start-up process according to a second embodiment of the present invention.

Next, a second embodiment of the present invention will be described. FIG. 6 is a flowchart showing details of a start-up process according to the second embodiment of the present invention. The flowchart in FIG. 6 is configured to add steps S601 and S602 between the step S502 and the step S503 of the flowchart in FIG. 5. It should be noted that the configurations shown in FIG. 1 through FIG. 4 of the above-mentioned first embodiment are common to the second embodiment. Thus, the descriptions thereof are omitted, and only different points from the above-mentioned first embodiment will be described.

The above-mentioned first embodiment enables shortening of the start-up time by changing the start-up process according to the power-OFF-timing state of the image forming apparatus 101. Incidentally, the MRAM 340 has characteristics of being sensitive to magnetism, and memory contents may change. Accordingly, in the second embodiment, depression of a specific button is detected at the time of the power ON in the step S601 in FIG. 6, and when the depression is detected, the information showing the power-OFF-timing state is changed to the "upgrade state" in the step S602. This always enables the image forming apparatus 101 to start up normally regardless of the power-OFF-timing state because a program is developed and a task is initialized in the same manner as in the "upgrade state".

Many of information processing apparatuses achieve extensions by attaching options. For example, an image forming apparatus achieves a font extension by attaching a specific option. Consequently, it is desirable to detect whether a mounting state of an option is changed at the start-up timing as described in the second embodiment, and to change the power-OFF-timing state to the "upgrade state" like in the step S602 in FIG. 6 in the second embodiment when the mounting state is changed. This enables the apparatus to start normally with conforming to the change of the mounting state of the option. It should be noted that the change of the mounting state of the option may be detected in any method or configuration.

The above-mentioned embodiments enable shortening of the start-up time by using the MRAM 340, which can continue holding information even after the power OFF, as a main memory. However, information (information about a secure job, for example) that was conventionally expected to be erased at the power OFF timing by using a volatile memory as a main memory will remain in the MRAM 340. Accordingly, the main CPU 301 is preferable to erase the information about the secure job saved in the MRAM 340 just before the step S406 in FIG. 4 and the step S507 in FIG. 5 and FIG. 6.

Although the above description described the image forming apparatus as an example of an information processing apparatus, an information processing apparatus to which the present invention is applied is not limited to an image forming apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-168568, filed Aug. 14, 2013, which is hereby incorporated by reference herein in its entirety.

What is claimed is:

1. An information processing apparatus comprising:
a non-volatile memory which stores a specific program;
a magnetoresistive random access memory (MRAM); and
a controller which stores status information of the information processing apparatus in the MRAM before receipt of an OFF instruction, and clears the status information stored in the MRAM and stores new status information in the MRAM after clearing the status information stored in the MRAM in accordance with the OFF instruction for turning off the information processing apparatus,
wherein, when the controller receives an ON instruction for turning on the information processing apparatus, the controller refers to the MRAM, and then, performs a first start-up process of the information processing apparatus including a storing process for storing the specific program stored in the non-volatile memory in the MRAM in a case where the status information stored in the MRAM has been cleared and the new status information has been stored in the MRAM and performs a second start-up process of the information processing apparatus without storing the specific program stored in the non-volatile memory in the MRAM in a case where the status information stored in the MRAM has not been cleared.

2. The information processing apparatus according to claim 1, wherein the new status information stored in the MRAM indicates an upgrade state where the controller issues the OFF instruction to itself after updating the specific program stored in the non-volatile memory.

3. The information processing apparatus according to claim 2, further comprising an operation unit configured to receive a specific instruction from an outside at a power OFF timing,
wherein the controller clears the status information stored in the MRAM and stores the new status information in the MRAM indicating the upgrade state when said operation unit receives the specific instruction.

4. The information processing apparatus according to claim 2, further comprising an option detection unit configured to detect a change of a mounting state of an option,
wherein the controller clears the status information stored in the MRAM and stores the new status information in the MRAM indicating the upgrade state when said option detection unit detects a change of the mounting state of the option.

5. The information processing apparatus according to claim 1, further comprising an instruction detection unit configured to detect the OFF instruction,
wherein the controller suspends a task that was under execution at a power OFF timing of the information processing apparatus, when said instruction detection unit detects the OFF instruction.

6. The information processing apparatus according to claim 5, wherein the controller determines whether initialization of the suspended task is needed based on information stored in the MRAM at the time of performing the first start-up process or the second start-up process of the information processing apparatus, initializes the suspended task when the initialization is needed, and releases suspension of the suspended task when the initialization is not needed.

7. The information processing apparatus according to claim 6, wherein the controller determines that the initialization of the suspended task is needed in a case where the status information stored in the MRAM that has not been cleared indicates an abnormal state where the power was turned OFF without receiving the OFF instruction and in a case where the new status information stored in the MRAM indicates an upgrade state where the controller issues the OFF instruction to itself after updating the specific program stored in the non-volatile memory or an under printing state where the OFF instruction was received during a printing operation.

8. The image forming apparatus according to claim 5, wherein the controller erases information about a secure job stored in the MRAM just before initialization of the suspended task.

9. The image forming apparatus according to claim 1, wherein the controller erases information about a secure job stored in the MRAM just before the power OFF of the information processing apparatus.

10. A control method for an information processing apparatus equipped with a non-volatile memory that stores a specific program, a magnetoresistive random access memory (MRAM), and a controller, the control method being implemented by the controller and comprising:
   storing status information of the information processing apparatus in the MRAM before receipt of an OFF instruction;
   clearing the status information stored in the MRAM and storing new status information in the MRAM after clearing the status information stored in the MRAM in accordance with the OFF instruction for turning off the information processing apparatus; and
   referring, when the controller receives an ON instruction for turning on the information processing apparatus, to the MRAM, and then, performing a first start-up process of the information processing apparatus including a storing process for storing the specific program stored in the non-volatile memory in the MRAM in a case where the status information stored in the MRAM has been cleared and the new status information has been stored in the MRAM and performing a second start-up process of the information processing apparatus without storing the specific program stored in the non-volatile memory in the MRAM in a case where the status information stored in the MRAM has not been cleared.

11. A non-transitory computer-readable storage medium storing a control program causing a computer to execute a control method for an information processing apparatus equipped with a non-volatile memory that stores a specific program, and a magnetoresistive random access memory (MRAM), the control method comprising:
   storing status information of the information processing apparatus in the MRAM before receipt of an OFF instruction;
   clearing the status information stored in the MRAM and storing new status information in the MRAM after clearing the status information stored in the MRAM in accordance with the OFF instruction for turning off the information processing apparatus; and
   referring, when the controller receives an ON instruction for turning on the information processing apparatus, to the MRAM, and then, performing a first start-up process of the information processing apparatus including a storing process for storing the specific program stored in the non-volatile memory in the MRAM in a case where the status information stored in the MRAM has been cleared and the new status information has been stored in the MRAM and performing a second start-up process of the information processing apparatus without storing the specific program stored in the non-volatile memory in the MRAM in a case where the status information stored in the MRAM has not been cleared.

* * * * *